United States Patent [19]

Benim et al.

[11] Patent Number: 4,731,407

[45] Date of Patent: Mar. 15, 1988

[54] POLYETHERESTER ELASTOMER COMPOSITION

[75] Inventors: Thomas E. Benim, Kinston, N.C.; Michael A. Hamilton, Kingston, Canada

[73] Assignee: E. I. Du Pont de Nemours and Company, Wilmington, Del.

[21] Appl. No.: 792,072

[22] Filed: Oct. 28, 1985

[51] Int. Cl.$^1$ ............................................. C08L 67/02
[52] U.S. Cl. ..................... 524/451; 524/539; 525/444
[58] Field of Search ................. 525/444; 524/451, 539

[56] References Cited

U.S. PATENT DOCUMENTS 3,651,014  3/1972  Witsiepe .
3,763,109  10/1973  Witsiepe .
3,766,146  10/1973  Witsiepe .
3,917,743  11/1975  Schroeder et al. .
3,932,326  1/1976  Hoh et al. .
3,968,183  7/1976  Hayashi ........................... 524/505

FOREIGN PATENT DOCUMENTS 59-58051  4/1984  Japan .

OTHER PUBLICATIONS

Nishimura et al "Elastomers Based on Polyester"*J. Macromol. Sci.* (Chem.), Al(4), 617–625 (1967).

*Primary Examiner*—Patricia A. Short

[57] ABSTRACT

A specific elastomeric composition is formed by melt blending two particular elastomers, each composed of hard and soft segments made from poly(tetra-methylene ether) glycol, 1,4-butane diol and a phenylene dicarboxylic acid or a derivative thereof. The blend exhibits a melting endotherm that extends from no lower than 120° C. to no higher than 215° C. with a melting peak in the range of 150° to 175° C. Films made from the composition are particularly suited for use as elastic legstrips in diapers.

4 Claims, 1 Drawing Figure

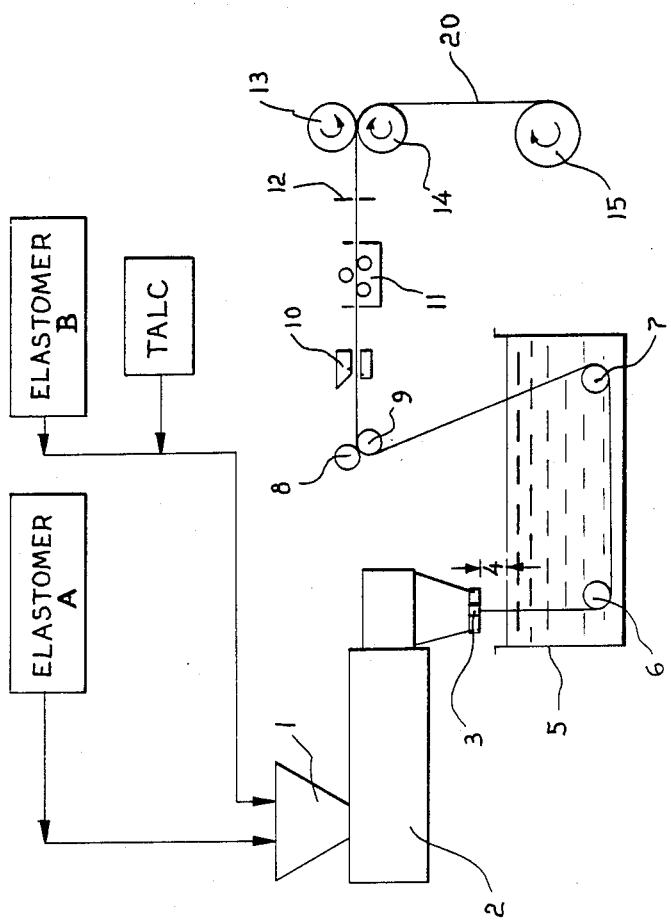

POLYETHERESTER ELASTOMER COMPOSITION

BACKGROUND OF THE INVENTION

1. Field of the Invention

This invention relates to a polyetherester elastomer composition. In particular, the invention concerns an improved composition formed from a melt blend of specific polyetherester elastomers and to a film produced therefrom. The composition is particularly useful in diaper-leg elastic tapes.

2. Description of the Prior Art

A wide variety of polyetheresters are known, as for example from Witsiepe, U.S. Pat. Nos. 3,651,014, 3,763,109, and 3,766,146, from Hok et al., U.S. Pat. No. 3,932,326, and from Nishimura et al., "Elastomers Based on Polyester", *J. Macromol Sci. (Chem.)*, Al(4), 617–625 (1967). Blends of copolyetheresters also are known, as for example from Schroeder et al., U.S. Pat. No. 3,917,743 and Japanese Patent Application Publication Kokai No. 59-58051. Although the known polyetherester compositions have been introduced heretofore for various purposes, such as for films and fibers, the known compositions have not been as effective as would be desired for certain applications. For example, thin elastic strips or films intended for gluing to the legs of baby diapers have a particularly difficult set of requirements. These requirements include high tenacity, high elongation, low set and high recovery-power per unit weight of film. In addition, such film must be free of excessive blocking in order to permit wide rolls of the film to be unwound without excessive sticking or film distortion. An object of the present invention is to provide an elastomeric composition that when converted into film will more readily meet these requirements than could the compositions of the prior art.

SUMMARY OF THE INVENTION

The present invention provides an improved elastomeric composition. The composition is of the type that is formed from a melt blend of polyetherester elastomers. Each of the elastomers is formed of soft and hard segments made from a poly(tetramethylene ether)glycol, 1,4-butane diol and a phenylene dicarboxylic acid or a derivative thereof. The improvement of the present invention, which makes the composition particularly suited for use in diaper-leg elastic tapes, comprises a first elastomer which amounts to 75% to 85% by weight of the blend and has hard segments amounting to 20% to 25% by weight of the first elastomer and soft segments of 1800 to 3000 molecular weight and a second elastomer which amounts to 15% to 25% by weight of the blend and has hard segments amounting to 40% to 55% by weight of the second elastomer and soft segments of 850 to 2000 molecular weight. The blend of the improved composition exhibits a melting endotherm over a temperature range that extends from no lower than 120° C. to no higher than 215° C. with a melting peak in the range of 150° to 175° C. In a preferred composition, finely divided particles of an inorganic anti-blocking agent, preferably talc, are incorporated into the blend in an amount in the range of 3 to 8% by weight of the blend.

The invention also includes a process for making a thin film from the above-described elastomeric composition. The process includes the stpes, in sequence, of melt-extruding the elastomeric composition through a slot orifice at a temperature in the range of 180° to 220° C., preferably 190° to 200° C., passing the extruded film through an air gap of preferably 3 to 25 mm length, most preferably 10 to 15 mm, quenching the film to a temperature below 50° C., preferably in a water bath, and removing the quenched film at a speed that provides a draw-down in the range of 12 to 40, preferably 15 to 25.

BRIEF DESCRIPTION OF THE DRAWING

The invention will be more readily understood by reference to the drawing which presents a flow sheet of a process suitable for preparing a thin film from an elastomeric composition of the invention.

DETAILED DESCRIPTION OF THE PREFERRED EMBODIMENTS

The terms "hard segment" and "soft segment" refer respectively to "short-" and "long-" chain ester units in the polymer chains of elastomers suitable for use in the present invention. The hard segments are derived from the reaction product of 1,4-butane diol with a phenylene dicarboxylic acid or a derivative thereof. The soft segments are derived from the reaction product of poly(tetramethylene ether)glycol with a phenylene dicarboxylic acid or a derivative thereof. The weight percent of these hard and soft segments are calculated by the methods described in U.S. Pat. No. 3,932,326, column 3, lines 9 through 42, the disclosure of which is hereby incorporated by reference.

The improved elastomeric composition of the invention is formed from a melt blend of two polyetherester elastomers, each of which is composed of the above described hard and soft segments. However, for the first elastomer, which amounts to 75 to 85% by weight of the blend, the hard segments make up 20 to 25% of the weight of the elastomer. The soft segments which make up the remainder of the first elastomer have a number average molecular weight in the range of 1800 to 3000. The second elastomer which amounts to 15 to 25% by weight of the blend has hard segments amounting to 40 to 55% by weight of the second elastomer. The soft segments which make up the remainder of the second elastomer have a number average molecular weight in the range of 850 to 2000. The methods by which these elastomers can be made are known in the art and are illustrated hereinafter in the Examples.

The preferred phenylene dicarboxylic acid for use in the present invention is terephthalic acid. However, as much as 30% of the terephthalic acid may be replaced by isophthalic acid without significant detriment to the properties of the elastomeric composition. When such a replacement is made, the phenylene dicarboxylic acid consists essentially of at least 70% terephthalic acid and no more than 30% isophthalic acid. Among the derivatives of the phenylene dicarboxylic acids which are suitable for use in the invention are dimethyl terephthalate, dimethyl isophthalate and the like.

The two elastomers may be mixed and melt-blended by means of any of several known devices such as single-screw extruders, twin-screw extruders, Banbury mixers, Farrell continuous mixers and the like. Injection molding equipment can also be used to accomplish melt-blending just prior to molding, but care must be taken to provide sufficient time and agitation to assure uniform blending prior to molding. The preferred equipment for melt-blending is a screw extruder, especially when an extruded film is the desired end product.

It is often desirable to include an inorganic anti-blocking agent in the elastomer composition to prevent the composition, when in the form of a rolled up sheet or film, from sticking to itself. A preferred anti-blocking agent is talc, amounting to 3 to 8% by weight of the elastomeric composition. Other anti-blocking agents that may be suitable for use in the elastomeric composition include silica, kaolin, clay, calcium carbonate, dicalcium phosphate and the like. Talc, especially a coated talc (e.g., Microflex ® 1200, manufactured by Pfizer) is preferred for the elastomeric compositions of this invention. Generally, quantities of anti-blocking agent above 8% are avoided—less than 6% are preferred—in order to avoid detrimentally affecting the stretch and recovery characteristics of the composition when formed into film.

Although talc is the preferred anti-blocking agent, the present inventors found that there is a problem with directly blending the talc with the first elastomer, (i.e., with the major component of the elastomeric composition of the invention). Excessive fuming is experienced. However, no such fuming occurs when the talc is so blended with the second elastomer. Thus, the anti-blocking agent usually is blended with the second elastomer in concentrations between 15 and 35% by weight of the second elastomer, in order to provide the desired concentration of talc in the final melt-blended elastomeric composition.

Talc can be incorporated into the second elastomer by any one of known conventional methods, such as by milling, compounding, screw-extruder mixing and the like.

After the elastomers have been prepared and, if necessary, mixed with talc, as shown in the attached drawing, the mixture is melt-blended, extruded through a slot orifice, quenched and then finished, slit and wound up. The melt-extrusion temperature generally is in the range of 180° to 220° C.; 190° to 200° C. is preferred. The quenching step may be carried out by use of a water bath, water spray, chill roll, flow of cold air or the like. Preferably, quenching is accomplished by immersion of the extruded film in a bath of water, the temperature of which is less than 50° C. The distance between the face of the orifice and the point of entry of the film into the water, called the "air gap" (designated 4 in the drawing), is usually in the range of 3 to 25 mm; 10 to 15-mm air gaps are preferred. Draw-down ratio, i.e., the cross-sectional area of the orifice divided by the cross-sectional area of the quenched film, is generally in the range of 12 to 40, but for most desired strength and stress-strain characteristics, a draw-down of 15 to 25 is preferred.

In addition to being handled by the above-described procedures, the elastomeric composition of the invention can be processed by melt-blowing, casting, molding or the like.

Various characteristics are reported herein for the melt-blended elastomers of the invention and for films extruded therefrom. These characteristics are determined as follows.

Number average molecular weight of the poly(tetramethylene ether)glycol in the elastomeric composition is determined by means of conventional gel permeation chromatographic analysis of the degradation components of the elastomer, after the elastomer has been boiled for an hour in ethylene glycol and then filtered.

Melting temperature is determined by means of a differential scanning calorimeter. A heatup rate of 20° C. per minute and a sample size of 5 to 10 milligrams are employed.

Melt index is determined in accordance with American Society of Testing Materials method ASTM D-1238, at 190° C., with a load of 2160 grams after drying the elastomer at 135° C. and 0.2 mm Hg. The units of melt index are g/10 min.

Stress-strain characteristics are measured in general in accordance with the general procedure of ASTM method D-412 employing an Instron Tester which is operated with chart speeds and cross-head speeds of 20 inches (50.8 cm) per minute and a two-inch (5.1-cm) gauge length. Tenacity at break is reported in grams per original dtex. Elongation is reported in %. Power is reported in grams per original dtex and set in %. To measure power, the sample is first elongated from 0 to 100% and back to zero through five cycles. The load at 50% elongation during the extension part of the fifth cycle is the measure of power used herein. After the last 0–100% elongation cycle, the Instron clamps are returned to their original position, the sample is relaxed for 30 seconds and the length, L, of the relaxed sample is measured in inches. Percent set is then calculated as 100 ((L/2)-1).

In the examples which follow, all percentages, proportions and parts are by weight, unless otherwise stated.

EXAMPLES

In these examples, two polyetherester elastomers are prepared and melt-blended to form a composition of the invention which is then extruded, quenched, slit and wound up to form thin film strips which are suitable for use as elastic strips in the leg portions of disposable diapers.

Preparation of Elastomer A

An "Additives Solution A" is prepared by adding the following ingredients to an agitated, steam-jacketed vessel and mixing the ingredients for 1¼ hours at 100° C.

|  | Parts |
| --- | --- |
| Polytetramethyleneether glycol; number average molecular weight about 2100 | 99.2 |
| Trimethyl trimellitate | 0.1 |
| 1,3,5-Trimethyl-2,4,6-tris[3,5-t-butyl-4-hydroxybenzyl]-benzene | 0.7 |

Elastomer A is prepared by continuously feeding the following material to the reboiler of a distillation column maintained at 200° C.

|  | Parts |
| --- | --- |
| Additives Solution A | 61.4 |
| 1,4-butanediol (100% molar excess) | 15.8 |
| Dimethyl terephthalate | 22.6 |
| Tetrabutyl titanate | 0.2 |

Methanol is distilled from the reaction mixture. The residence time of the mixture in the reboiler is approximately 3 hours. The reaction mixture is then pumped into a first reaction vessel where it is maintained for 40 minutes at a temperature of 225° C. and a pressure of 12 mm Hg absolute. In this vessel, a low molecular weight polymer is formed and the majority of the unreacted 1,4-butanediol is flashed off. The resultant low molecular weight polymer then is transferred to a second vessel in which the polymer is agitated for 40 minutes at a temperature of 240° C. and a pressure of 12 mm Hg absolute to increase the molecular weight of the polymer. The polymer then is transferred for two hours to a finisher which is operated at 255° C. and at 1.1 mm Hg absolute. A high molecular weight polymer is obtained. The polymer is then removed from the finisher and extruded into strands which are quenched with water at ambient temperature on a casting table and cut into pellets. The finished polymer has an inherent viscosity of about 1.8 (measured at 30° C. in m-cresol at a concentration of 0.5 g/dcl), a melting endotherm peak at 172° C., a melt index of 5.0 and a Shore A hardness of about 85. Elastomer A consists of 77% soft segment and 23% hard segment.

Preparation of Elastomer B

Elastomer B is produced by the same general procedure and with the same equipment as Elastomer A. An "Additives Solution B" is prepared with the following ingredients:

|  | Parts |
| --- | --- |
| Polytetramethyleneether glycol; number average molecular weight about 975 | 78.9 |
| Dimethyl isophthalate | 20.5 |
| Trimethyl trimellitate | 0.1 |
| N,N'—Trimethylene-bis(3,5-di-t-butyl- 4-hydroxy-hydrocinnamamide) | 0.3 |
| N N'—hexamethylene-bis-(3,5-di-t-butyl-4-hydroxy-hydrocinnamamide) | 0.3 |
| Poly(dimethyl siloxane) | 1.7 ppm |

The following materials are fed into the reboiler of the distillation column:

|  | Parts |
| --- | --- |
| Additives Solution B | 45.8 |
| 1,4-butanediol (35% molar excess) | 21.7 |
| Dimethyl terephthalate | 32.3 |
| Tetrabutyl titanate | 0.2 |

Elastomer B is prepared at pressures of 20 mm Hg absolute in the first two vessels and about 1.0 mm Hg absolute in the finisher and at the same process temperatures as are used for Elastomer A. Elastomer B has an inherent viscosity of about 1.4 (measured at 30° C. in m-cresol at a concentration of 0.1 g/dcl), a melting endotherm peak at 149.4° C., a melt index of 5.3 and a Shore D hardness of about 40. Elastomer B consists of 51% soft segment and 49% hard segment. The ratio of terephthalate to isophthalate in the hard segment is 77/23.

Compounding with Talc

Microflex® 1200 talc, manufactured by Pfizer and having an average particle size of less than about 12 microns is incorporated into Elastomer B by mixing the talc and pellets of Elastomer B in a Farrell continuous mixer. The mixer applies a large shear stress to the elastomer to cause it to melt while being mixed and compounded with the talc. The talc amounts to 20% by total weight of the talc/Elastomer B mixture.

Preparation of Thin Films

Equipment of the type depicted in the schematic flow diagram of the attached drawing is employed to prepare a series of thirteen thin-film samples made from a melt-blended composition of the invention.

As shown by the flow diagram, Elastomer B is compounded with talc as described above and then conveyed and metered into feed device 1 of screw-mixer extruder 2. Elastomer A also is conveyed and metered to extruder feed device 1 to form a mixture composed of 80% Elastomer A, 16% Elastomer B and 4% talc. The mixture is melt-blended in the screw of extruder 2 while being heated in stages to a final melt extrusion temperature. The mixture is extruded through slot orifice 3 which measures 20.3-cm (8-inches) long by 0.38-mm (0.015-inch) wide. The extruded film, designated 20 throughout the flow diagram, is then passed through air-gap 4 into water-filled quench tank 5 where it travels around guides 6 and 7, and then out of the water through a pair of nip rolls 8, 9. The film is then forwarded to slitter 10, where the film is slit into strips of about 6.7-mm (0.265-inch) width. The strips are then passed through finish applicator 11, through comb guides 12, and forwarded by puller rolls 13, 14 to windup roll 15.

In passage from slot orifice 3 to nip rolls 8, 9, the film undergoes a reduction in cross-sectional dimensions called a "draw-down" which is defined as the area of the slot orifice divided by the cross-sectional area of the quenched film. The finish applied by applicator 11 consists essentially of a polyalkylene glycol and a nonionic surfactant and amounts to about 1 to 4% by weight of the film. The windup roll 15 is a driven cylindrical core which measures about 33 cm (13 inches) in length and 10.1 cm (4 inches) in diameter, on which film-strip product is wound to form a maximum diameter of about 30.5 cm (12 inches).

The melt-blended elastomeric composition, made in accordance with the above-described procedure, has a melting endotherm that extends from about 125° to 210° C. and a melting peak at about 160° C.

The particular conditions under which the thirteen samples are made is summarized in Table I. The physical characteristics of the resultant film strips are summarized in Table II. Note that substantially all of these samples, except for the sample produced in test No. 6, are suited for use as elastic leg-strips for disposable diapers. The strips each have a high break tenacity of at least 0.4 g/dtex, a high elongation at break of at least 450%, a high power at 50% elongation of at least 0.035 g/dtex, and a low set of less than 15%.

TABLE I

| Test No. | OPERATING CONDITIONS | | | | |
| --- | --- | --- | --- | --- | --- |
| | Temperature, °C. | | Air Gap | Speed | Draw |
| | Melt | Quench | mm | m/min. | Down |
| 1 | 195 | 30 | 12 | 93.0 | 21.4 |
| 2 | 210 | 27 | 12 | 87.8 | 18.5 |
| 3 | 195 | 30 | 4 | 87.5 | ** |
| 4 | 194 | 30 | 12 | 87.5 | 20.6 |
| 5 | 193 | 30 | 20 | 89.0 | 19.6 |
| 6 | 194 | 30 | 12 | 43.9 | 10.9 |
| 7 | 194 | 30 | 12 | 134.4 | 33.3 |
| 8 | 195 | 30 | 12 | 89.9 | 25.0 |
| 9 | 195 | 30 | 12 | 89.9 | 15.4 |
| 10 | 180 | 30 | 12 | 89.0 | 17.1 |

TABLE I-continued

| | OPERATING CONDITIONS | | | | |
|---|---|---|---|---|---|
| Test | Temperature, °C. | | Air Gap | Speed | Draw |
| No. | Melt | Quench | mm | m/min. | Down |
| 11 | 197 | 20 | 12 | 90.2 | 15.9 |
| 12 | 197 | 30 | 12 | 90.2 | 19.5 |
| 13 | 194 | 40 | 12 | 88.4 | 14.6 |

**Not measured.

TABLE II

| | PRODUCT CHARACTERISTICS* | | | | | | |
|---|---|---|---|---|---|---|---|
| Test No. | Thickness mm | Width cm | Weight dtex | Tenacity g/dtex | Elongation % | Power g/dtex | % Set |
| 1 | 0.036 | 10.2 | 3395 | 0.54 | 630 | 0.040 | 12.5 |
| 2 | 0.038 | 10.8 | 3480 | 0.55 | 674 | 0.039 | 14.5 |
| 3 | 0.038 | ** | 3280 | 0.61 | 519 | 0.042 | 13.0 |
| 4 | 0.036 | 10.8 | 3383 | 0.55 | 615 | 0.039 | 13.8 |
| 5 | 0.038 | 10.2 | 3345 | 0.53 | 680 | 0.037 | 12.0 |
| 6 | 0.066 | 10.8 | 6543 | 0.41 | 770 | 0.033 | 15.5 |
| 7 | 0.023 | 10.2 | 2270 | 0.64 | 482 | 0.040 | 13.0 |
| 8 | 0.030 | 10.2 | 2593 | 0.55 | 545 | 0.040 | 13.5 |
| 9 | 0.048 | 10.2 | 4350 | 0.50 | 600 | 0.041 | 14.2 |
| 10 | 0.043 | 10.8 | 3608 | 0.55 | 544 | 0.042 | 13.5 |
| 11 | 0.036 | 14.0 | 3110 | 0.60 | 574 | 0.041 | 13.0 |
| 12 | 0.038 | 10.8 | 3583 | 142 53 | 601 | 0.042 | 13.5 |
| 13 | 0.043 | 12.1 | 3913 | 0.51 | 545 | 0.037 | 13.7 |

*width is before slitting; weight is after slitting
**Not measured.

We claim:

1. An improved elastomeric composition formed from a melt blend of polyetherester elastomers, each elastomer being formed of hard and soft segments made from reactants consisting essentially of a poly(tetramethylene ether)glycol, 1,4-butane diol and a phenylene dicarboxylic acid or a derivative thereof, the improvement wherein the phenylene dicarboxylic acid consists essentially of at least 70% terephthalic acid and no more than 30% isophthalic acid a first elastomer amounts to 75 to 85% by weight of the blend and has hard segments amounting to 20 to 25% by weight of said elastomer and soft segments of 1800 to 3000 number average molecular weight, a second elastomer amounts to 15 to 25% by weight of the blend and has hard segments amounting to 40 to 55% by weight of said second elastomer and soft segments of 850 to 2000 number average molecular weight, and the blend exhibits a melting endotherm over a temperature range that extends from no lower than 120° C. to no higher than 215° C. with a melting peak in the range of 150° to 175° C.

2. A composition of claim 1 in which finely divided particles of an inorganic anti-blocking agent are incorporated in an amount in the range of 3 to 8% by weight of the elastomer blend.

3. A composition of claim 2 wherein the anti-block agent is talc.

4. A composition of claim 1, 2 or 3 wherein the phenylene dicarboxylic acid is terephthalic acid.

* * * * *